(12) United States Patent
Matsuda et al.

(10) Patent No.: US 10,934,699 B2
(45) Date of Patent: Mar. 2, 2021

(54) TOILET

(71) Applicant: LIXIL Corporation, Tokyo (JP)

(72) Inventors: Hiroshi Matsuda, Tokyo (JP); Naohisa Oota, Tokyo (JP); Shunsuke Takahashi, Tokyo (JP)

(73) Assignee: LIXIL Corporation, Tokyo (JP)

(*) Notice: Subject to any disclaimer, the term of this patent is extended or adjusted under 35 U.S.C. 154(b) by 0 days.

(21) Appl. No.: 16/311,662

(22) PCT Filed: Mar. 9, 2017

(86) PCT No.: PCT/JP2017/009352
§ 371 (c)(1),
(2) Date: Dec. 19, 2018

(87) PCT Pub. No.: WO2017/221474
PCT Pub. Date: Dec. 28, 2017

(65) Prior Publication Data
US 2019/0203455 A1    Jul. 4, 2019

(30) Foreign Application Priority Data

Jun. 23, 2016  (JP) .............................. JP2016-124664

(51) Int. Cl.
*E03D 11/00*    (2006.01)
*H02J 50/12*    (2016.01)
*A47K 13/30*    (2006.01)
*H02J 5/00*     (2016.01)

(52) U.S. Cl.
CPC ............ *E03D 11/00* (2013.01); *A47K 13/305* (2013.01); *H02J 5/005* (2013.01); *H02J 50/12* (2016.02)

(58) Field of Classification Search
CPC . H02J 50/50; H02J 5/005; H02J 50/12; E03D 11/00; A47K 13/305
See application file for complete search history.

(56) References Cited

U.S. PATENT DOCUMENTS

| | | | |
|---|---|---|---|
| 2015/0349578 A1* | 12/2015 | Hu ......................... | H02J 7/0042 320/108 |
| 2016/0049827 A1* | 2/2016 | Tilvis ...................... | H02J 50/10 320/108 |
| 2017/0054330 A1* | 2/2017 | You ......................... | H01F 38/14 |

FOREIGN PATENT DOCUMENTS

| | | |
|---|---|---|
| JP | 2015-83148 | 4/2015 |
| JP | 5717068 | 5/2015 |
| JP | 2015119577 A * | 6/2015 |
| WO | 2014/076801 | 5/2014 |

(Continued)

OTHER PUBLICATIONS

International Search Report dated May 16, 2017, directed to International Application No. PCT/JP2017/009352; 4 pages.

*Primary Examiner* — Daniel J Cavallari
(74) *Attorney, Agent, or Firm* — Morrison & Foerster LLP

(57) ABSTRACT

The toilet device is provided with a toilet device including a relay coil that has a first coil connected to one end of a connecting line and a second coil connected to the other end of the connecting line and a power reception coil. The first coil is configured to output the power received from a power supply coil by utilizing magnetic resonance to the second coil via the connecting line. The second coil is configured to supply the power received via the connecting line to the power reception coil by utilizing magnetic resonance.

7 Claims, 8 Drawing Sheets

(56) References Cited

FOREIGN PATENT DOCUMENTS

| WO | 2015/147093 | 10/2015 |
| WO | 2016/017022 | 2/2016 |

\* cited by examiner

TOILET

REFERENCE TO RELATED APPLICATIONS

This application is a national stage application under 35 USC 371 of International Application No. PCT/JP2017/009352, filed Mar. 9, 2017, which claims the priority of Japanese Application No. 2016-124664, filed Jun. 23, 2016, the entire contents of each of which are incorporated herein by reference.

FIELD OF THE INVENTION

The present invention relates to a toilet.

BACKGROUND OF THE INVENTION

A non-contact power supply system that transmits power from a power supply device to a power reception device without contact is started to be widely used in recent years.

For example, a non-contact power supply system that includes a plurality of resonance elements (helical coils), each of which has a disk-shape including a planar surface portion and a side portion and is disposed such that the side portions of the resonance elements are in close contact with each other, is disclosed in Patent Document 1. The non-contact power supply system relays power to a power reception device which is at a long distance by resonating the respective resonance elements, which are adjacent to each other, and causing power from a power supply device to hop.

Patent Document 1 Japanese Patent No. 5717068

SUMMARY OF THE INVENTION

However, when a metal exists nearby the resonance elements in the non-contact power supply system disclosed in Patent Document 1, combined magnetic fields of the respective resonance elements are affected by the metal and a power transmission loss increases in some cases.

The present invention is devised in view of such circumstances, and an object thereof is to provide a toilet that is capable of suppressing an increase in a power transmission loss in a case where power is supplied without contact at a place where it is difficult to dispose a power supply device and a power reception device close to each other.

According to a first aspect of the present invention, there is provided a toilet including a relay coil that has a first coil connected to one end of a connecting line and a second coil connected to the other end of the connecting line and a power reception coil. The first coil is configured to output the power received from a power supply coil by utilizing magnetic resonance to the second coil via the connecting line. The second coil is configured to supply the power, which is received via the connecting line, to the power reception coil by utilizing magnetic resonance.

According to a second aspect of the present invention, in the toilet according to the first aspect, at least any one of the first coil, the second coil, and the connecting line is a thin conductive layer printed on an insulating member.

According to a third aspect of the present invention, in the toilet according to the first aspect or the second aspect, the relay coil is provided in a toilet bowl or a water storage tank of the toilet.

According to a fourth aspect of the present invention, in the toilet according to the third aspect, the connecting line is disposed in the toilet bowl or the water storage tank of the toilet so as to avoid disposing the connecting line inside a water storage unit which stores cleaning water.

According to a fifth aspect of the present invention, in the toilet according to any one of the first aspect to the fourth aspect, the power supply coil and the first coil are close to each other.

According to a sixth aspect of the present invention, the toilet according to any one of the first aspect to the fifth aspect further includes, a power storage unit that stores the power in which the power reception coil receives from the second coil by utilizing magnetic resonance and is configured to supply the stored power to a load.

As described above, the toilet that can suppress a power transmission loss can be provided according to the present invention.

DETAILED DESCRIPTION OF THE INVENTION

Figure 1:
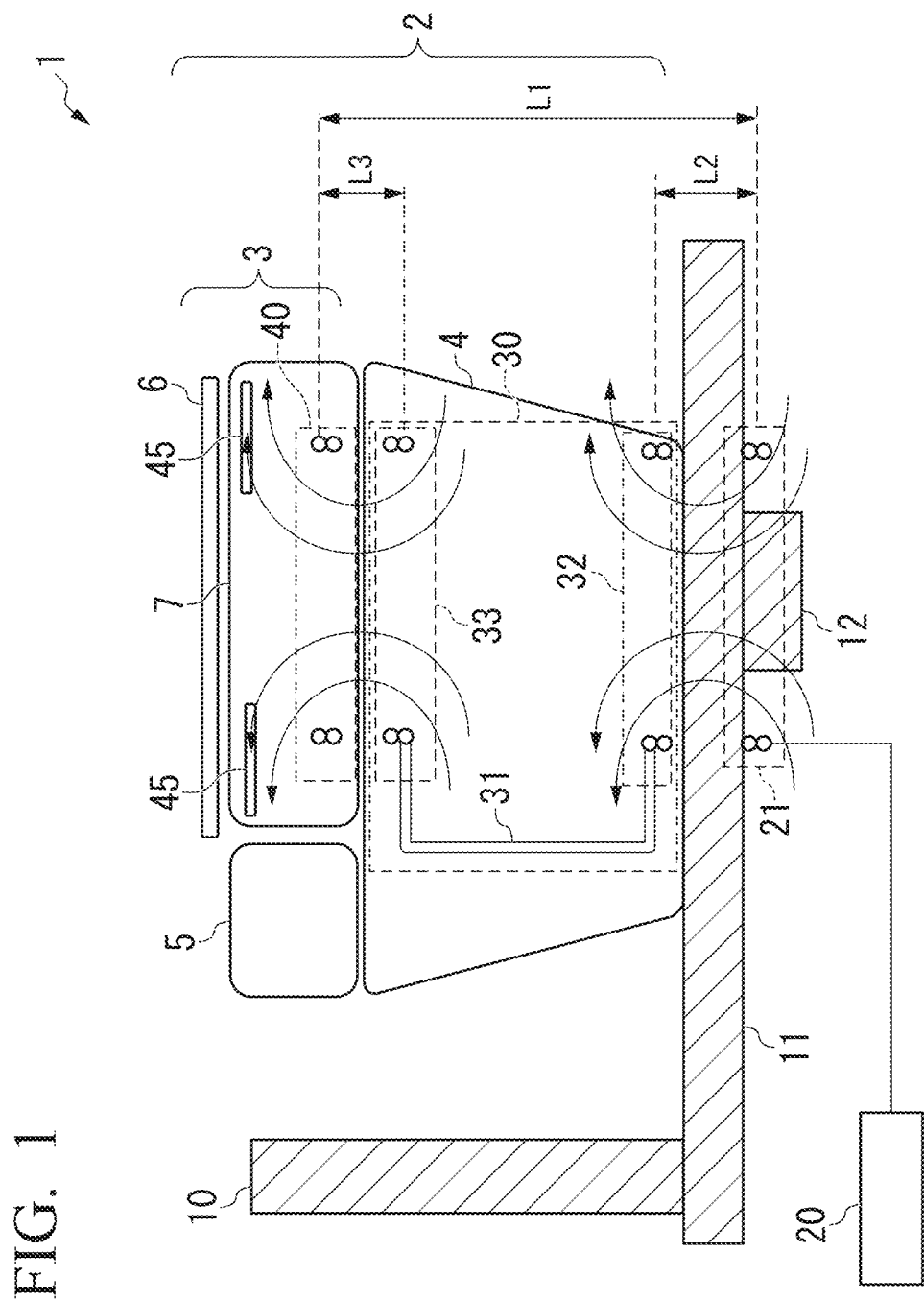
FIG. 1 is a view showing an example of a schematic configuration of a toilet system 1 including a relay coil 30 according to a first embodiment.

Hereinafter, the present invention will be described through embodiments of the invention, but the following embodiments do not limit the invention according to the claims. In addition, not all combinations of characteristics described in the embodiments are required as a solution to a problem of the invention. The same or similar portions in the drawings will be assigned with the same reference signs and overlapping description will be omitted in some cases.

Hereinafter, a toilet of the embodiments will be described with reference to the drawings.

FIG. 1 is a view showing an example of a schematic configuration of a toilet system 1 including a toilet 2 according to a first embodiment.

The toilet system 1 includes the toilet 2, a power supply unit 20, and a power supply coil 21.

As shown in FIG. 1, the toilet 2 is provided in a toilet room including a wall 10 and a floor 11.

The toilet 2 includes a toilet seat device 3 and a toilet bowl 4.

The toilet seat device 3 is mounted on the toilet bowl 4 provided inside the toilet room. The toilet seat device 3 includes a toilet seat box 5, a toilet lid 6, and a toilet seat 7.

The toilet seat box 5 is mounted on a rear part of the toilet bowl 4.

The toilet lid 6 and the toilet seat 7 are supported so as to be rotatable in an up-and-down direction about the toilet seat box 5.

A toilet seat heater 45 and a power reception coil 40 are provided in the toilet seat 7. The toilet seat heater 45 is electrically connected to the power reception coil 40. The toilet seat heater 45 is a heater that heats the toilet seat 7 by power being supplied from the power reception coil 40 and warms the toilet seat 7. For example, a tubing heater, a planar heater, or the like is used as the toilet seat heater 45.

A relay coil 30 is provided in the toilet bowl 4.

The relay coil 30 relays power between the external power supply coil 21 and the power reception coil 40.

The relay coil 30 includes a connecting line 31, a first coil 32, and a second coil 33.

The first coil 32 is connected to one end of the connecting line 31.

The second coil 33 is connected to the other end of the connecting line 31.

For example, the connecting line 31 of the relay coil 30 is disposed in the toilet bowl 4, but the connecting line is not disposed inside a water storage unit storing cleaning water which is inside the toilet bowl 4. That is, the connecting line 31 is disposed in the toilet bowl 4 so as to avoid coming into contact with cleaning water.

The first coil 32 outputs power received from the power supply coil 21 by magnetic resonance to the second coil 33 via the connecting line 31.

The second coil 33 magnetically resonates with the power reception coil 40 by using the power received via the connecting line 31. Accordingly, the relay coil 30 relays power, which is received from the external power supply coil 21, to the power reception coil 40. Consequently, the power reception coil 40 is capable of supplying the power received by magnetically resonating with the second coil 33 to the toilet seat heater 45. The length of the connecting line 31 may be set according to a distance between the power supply coil 21 and the power reception coil 40, may be set according to a shape of a place where the relay coil 30 is mounted, or may be set according to both. Although a case where the relay coil 30 is provided in the toilet bowl 4 has been described in the first embodiment, the invention is not limited thereto. That is, the relay coil 30 may be mounted on the toilet 2, and the mounting position thereof is not particularly limited.

The power supply unit 20 is provided outside the toilet room, for example.

The power supply unit 20 is connected to the power supply coil 21. The power supply unit 20 supplies power to the power supply coil 21.

The power supply coil 21 is provided at a position that allows magnetic resonance with the first coil 32 of the relay coil 30. For example, the power supply coil 21 is provided on a back side of the floor 11 of the toilet room (under the floor).

The power supply coil 21 supplies power, which is output from the power supply unit 20, to the first coil 32 by magnetically resonating with the first coil 32. There is a possibility that electric leakage occurs when a cable, through which power is supplied from under the floor to the toilet 2, is wired close to plumbing such as a drain pipe 12. Accordingly, power is supplied from the power supply coil 21 to the first coil 32 without contacting each other. The power supply coil 21 and the first coil 32 may be disposed close to each other.

In such a manner, in the first embodiment, power is transmitted from the power supply coil 21 to the power reception coil 40 via the relay coil 30 without contacting with each other. Consequently, in the first embodiment, transmission distances L2 and L3 over which power is wirelessly transmitted are shorter than a transmission distance L1 in a case where power is directly transmitted from the power supply coil 21 mounted under the floor to the power reception coil 40 without contact. As a result, a transmission loss attributable to a metal is small, and thus disturbance attributable to the metal is unlikely to be received as well.

Figure 2:
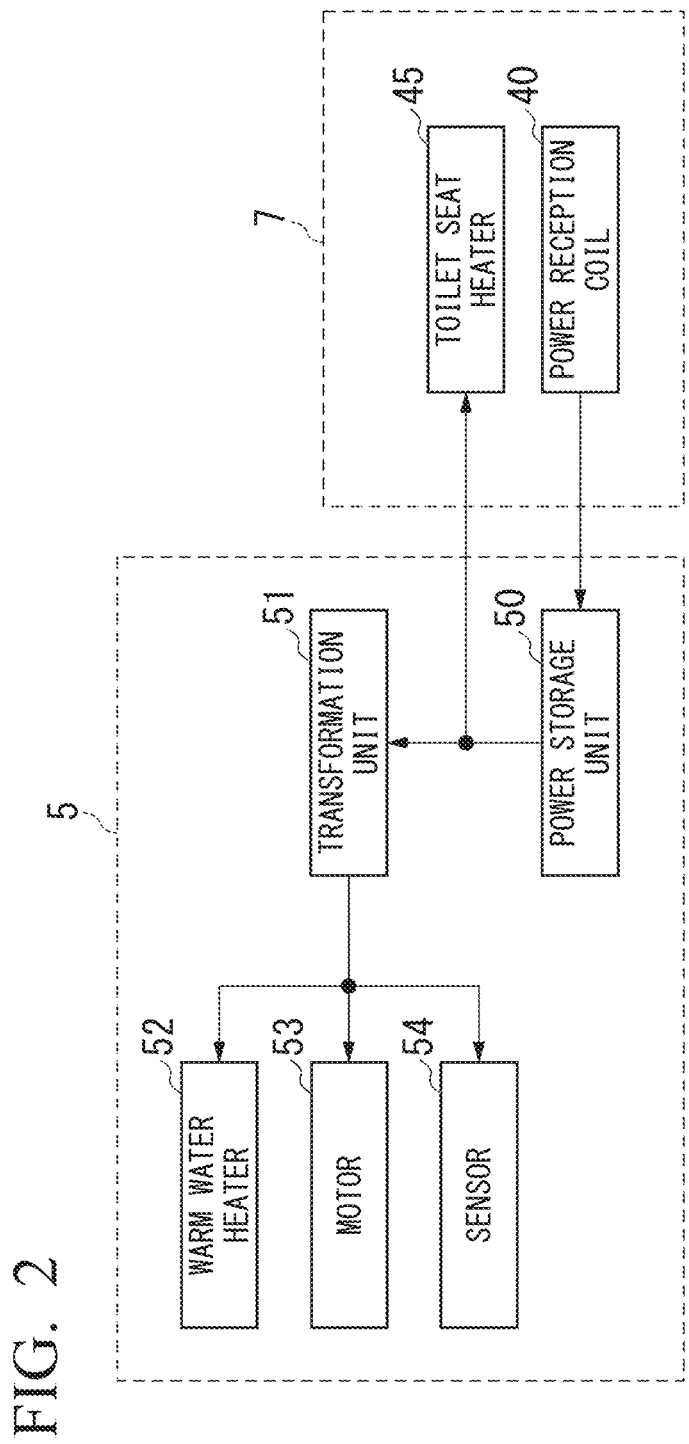
FIG. 2 is a diagram showing an example of a schematic configuration of a toilet seat box 5 according to the first embodiment.

FIG. 2 is a diagram showing an example of a schematic configuration of the toilet seat box 5 according to the first embodiment.

As shown in FIG. 2, the toilet seat box 5 includes a power storage unit 50, a transformation unit 51, a warm water heater 52, a motor 53, and a sensor 54.

The power storage unit 50 stores power in which the power reception coil 40 receives the power from the second coil 33 by utilizing magnetic resonance. For example, the power storage unit 50 is connected to the power reception coil 40 in a wired or wireless manner. In a case where the power storage unit 50 is connected to the power reception coil 40 in a wired manner, the power storage unit stores power received via the wire. On the other hand, in a case where the power storage unit 50 is wirelessly connected to the power reception coil 40, the power storage unit stores power wirelessly received from the power reception coil 40. Herein, "wireless" power transmission means power transmission without contact, and examples of wireless power transmission include an electric field coupling system, an electromagnetic induction system, an electromagnetic wave system, a magnetic resonance system, and the like.

The power stored in the power storage unit 50 is supplied to each of the transformation unit 51 and the toilet seat heater 45.

The toilet seat heater 45 heats the toilet seat 7 by the power being supplied from the power storage unit 50 and warms the toilet seat 7.

The transformation unit 51 converts the power supplied from the power storage unit 50 to have a predetermined voltage and supplies the converted power to the warm water heater 52, the motor 53, and the sensor 54.

The warm water heater 52 is a heater that warms cleaning water for cleaning buttocks of a user who is seated on the toilet seat 7 by using the power supplied from the transformation unit 51.

The motor 53 is a motor for rotating the toilet seat 7 and the toilet lid 6 in a rising-falling manner by using the power supplied from the transformation unit 51.

The sensor 54 is a human body detecting sensor that detects a human body, a seat sensor that detects sitting motion on the toilet seat 7, or the like by using the power supplied from the transformation unit 51.

In such a manner, the power storage unit 50 supplies power to each of the warm water heater 52, the motor 53, and the sensor 54 after storing power received from the power reception coil 40. Consequently, in a case where a load has changed in the warm water heater 52, the motor 53, and the sensor 54 in this order, power is capable of being supplied to the load without lowering efficiency even when impedance matching is not performed. The toilet seat box 5 of the embodiment may supply power to a load while performing impedance matching without using the power storage unit 50.

Figure 3:
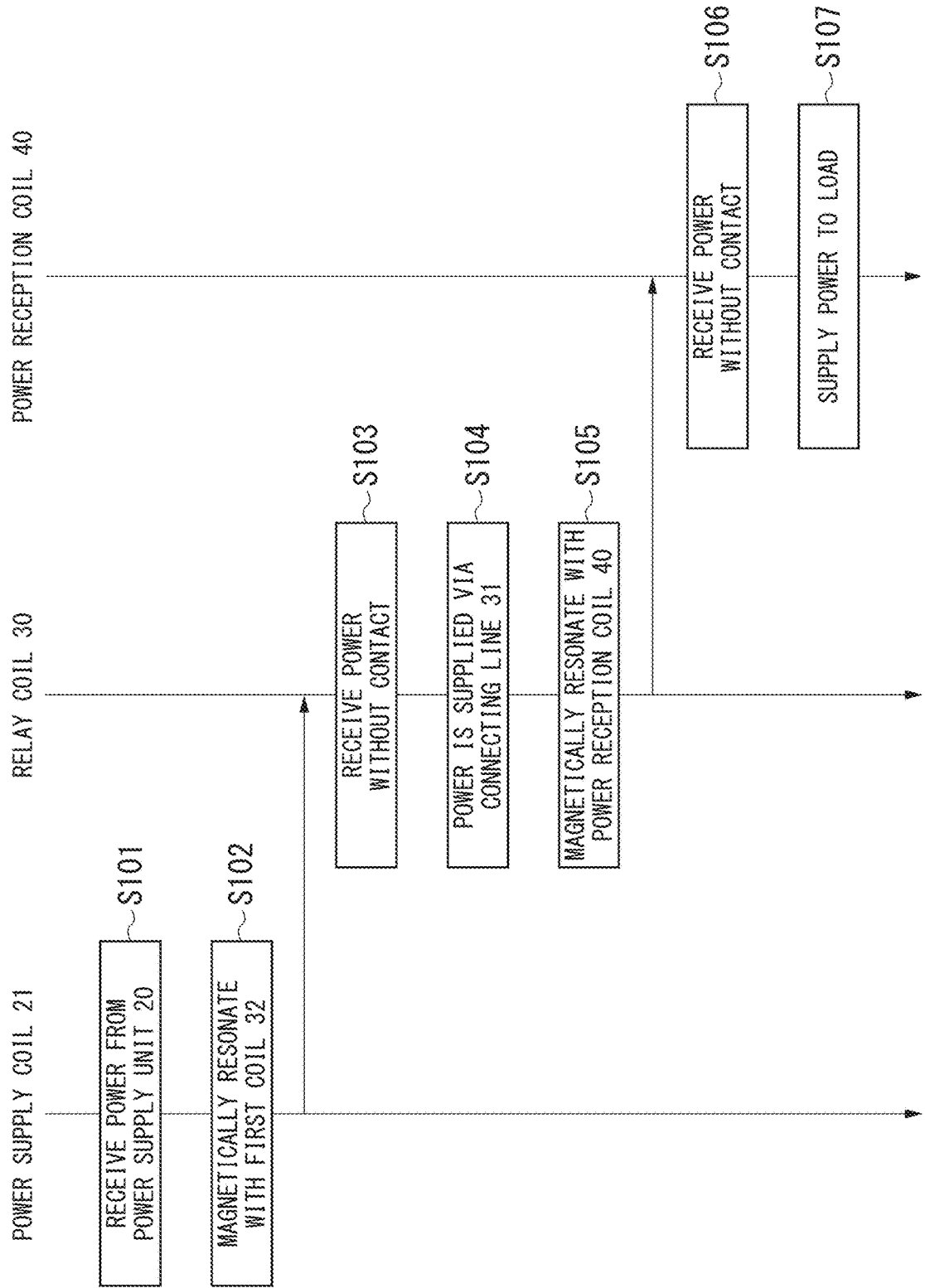
FIG. 3 is a sequence diagram showing operation of the toilet system 1 according to the first embodiment.

Hereinafter, operation of the toilet system 1 according to the first embodiment will be described. FIG. 3 is a sequence diagram showing the operation of the toilet system 1 according to the first embodiment.

The power supply coil 21 is supplied power from the power supply unit 20 (Step S101). The power supply coil 21 magnetically resonates with the first coil 32 based on the power supplied from the power supply unit 20 (Step S102). Accordingly, the power output from the power supply unit 20 is supplied to the first coil 32 without contact.

The first coil 32 magnetically resonates with the power supply coil 21, thereby causing the first coil 32 to receive the power from the power supply coil 21 without contact (Step S103). The power received by the first coil 32 is supplied to the second coil 33 via the connecting line 31 (Step S104).

The second coil 33 magnetically resonates with the power reception coil 40 by using the power received via the connecting line 31. Accordingly, the relay coil 30 relays power, which is from the external power supply coil 21, to the power reception coil 40.

The power reception coil 40 magnetically resonates with the second coil 33, thereby causing the power reception coil 40 receives the power from the second coil 33 without contact (Step S106). Then, the power reception coil 40 supplies the received power to an electrically connected load (the toilet seat heater 45, the warm water heater 52, the motor 53, the sensor 54, and the like).

As described above, the toilet 2 according to the first embodiment includes the relay coil 30 that relays power between the external power supply coil and the power reception coil. The relay coil 30 includes the first coil 32 connected to the one end of the connecting line 31 and the second coil 33 connected to the other end of the connecting line 31. The first coil 32 outputs power received from the power supply coil 21 by utilizing magnetic resonance to the second coil 33 via the connecting line 31. The second coil 33 magnetically resonates with the power reception coil 40 by using the power received via the connecting line 31. Accordingly, in a case where power is supplied without contact at a place where it is difficult to dispose the power supply coil 21 (power supply device) and the power reception coil 40 (power reception device) close to each other, the relay coil 30 is used, thereby shortening a distance of wireless power transmission compared to the related art. For this reason, it is possible to suppress an increase in a power transmission loss even when a metal is existed nearby.

In the embodiment described above, an electromagnetic shield may be provided between the toilet seat heater 45 and the power reception coil 40. Accordingly, an effect of an electromagnetic field generated in the power reception coil 40 having on the toilet seat heater 45 is capable of being reduced.

In the embodiment described above, a function of the toilet seat box 5 and the power supply unit 20 wirelessly communicating with each other may be included. For example, in a case where the human body detecting sensor, which serves as the sensor 54, has detected a human body, the toilet seat box 5 transmits the detection result to the power supply unit 20 by wireless communication. Then, in a case where the power supply unit 20 has acquired the detection result indicating detection of the human body from the human body detecting sensor by wireless communication, the power supply unit stops supplying power to the power supply coil 21. Accordingly, in a case where a user is not seated on the toilet seat 7, the toilet seat 7 is warmed. That is, in a case where a user is seated on the toilet seat 7, an electromagnetic field is not generated to the extent possible.

Figure 4:
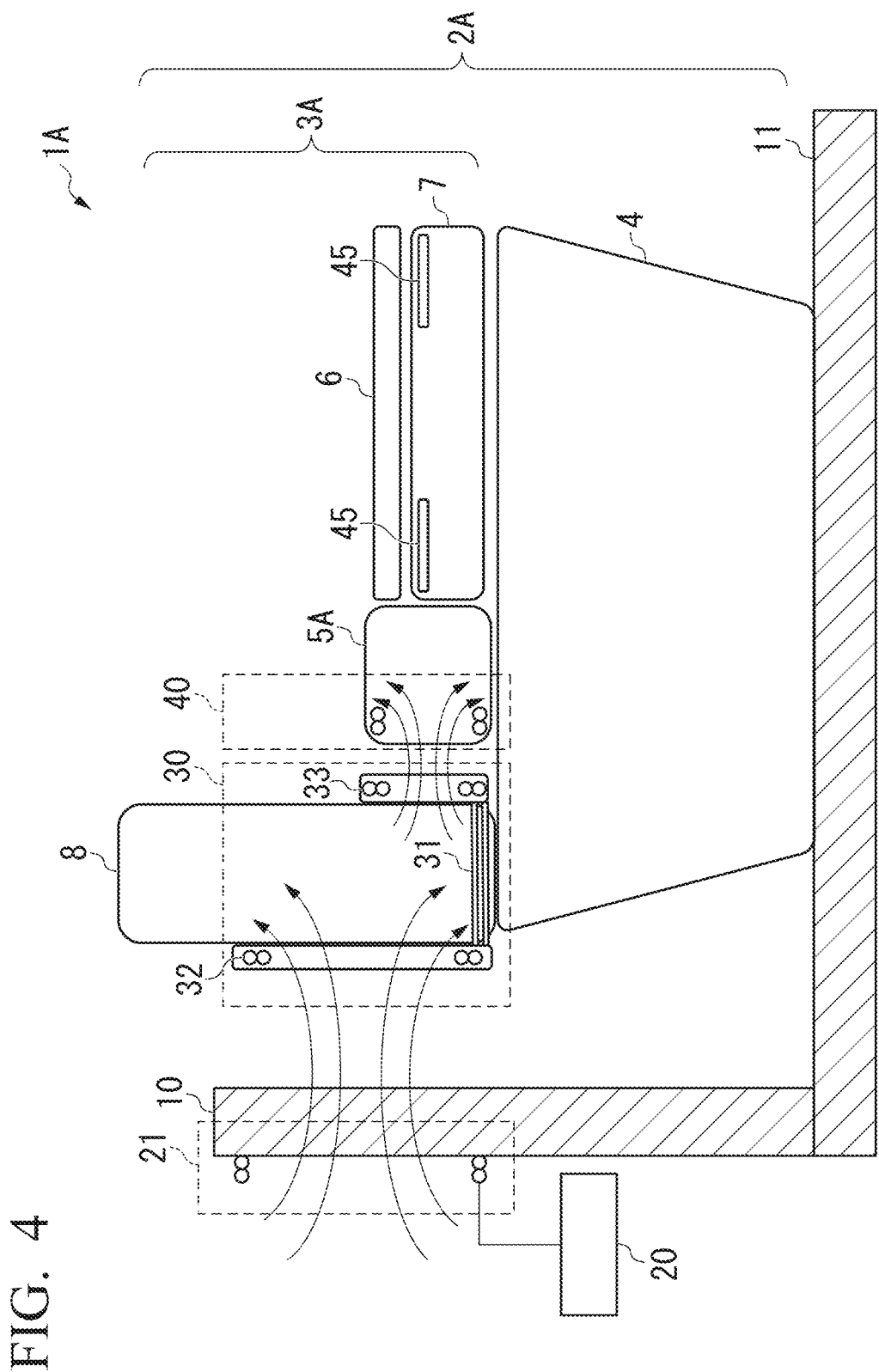
FIG. 4 is a view showing an example of a schematic configuration of a toilet system 1A including the relay coil 30 according to a second embodiment.

FIG. 4 is a view showing an example of a schematic configuration of a toilet system 1A including the relay coil 30 according to a second embodiment. A case where, the relay coil 30 is provided in the toilet, which is provided with a water storage tank 8, will be described in the second embodiment.

The toilet system 1A includes a toilet 2A, the power supply unit 20, and the power supply coil 21.

As shown in FIG. 4, the toilet 2A is provided in a toilet room including the wall 10 and the floor 11.

The toilet 2A includes a toilet seat device 3A and the toilet bowl 4.

The toilet seat device 3A is mounted on the toilet bowl 4 provided inside the toilet room. The toilet seat device 3A includes a toilet seat box 5A, the toilet lid 6, the toilet seat 7, and the water storage tank 8.

The power reception coil 40 is provided in the toilet seat box 5A.

The tank for storing water 8 is provided on a rear side of the toilet bowl 4. The tank for storing water 8 stores cleaning water to be supplied into the toilet bowl 4. In addition, the relay coil 30 is provided in the water storage tank 8. As shown in FIG. 4, the first coil 32 is provided on a back surface of the water storage tank 8, the back surface being positioned on a wall 10 side. The second coil 33 is provided on a front surface of the water storage tank 8. The connecting line 31 that connects the first coil 32 to the second coil 33 is provided on a side surface of the water storage tank 8.

The power supply coil 21 is provided at a position that allows magnetic resonance with the first coil 32 of the relay coil 30. For example, in the second embodiment, the power supply coil 21 is provided on a back side of the wall 10 of the toilet room.

The power supply coil 21 supplies power, which is output from the power supply unit 20, to the first coil 32 by utilizing magnetic resonance with the first coil 32.

The power is transmitted without contact from the power supply coil 21 mounted on the wall 10 to the first coil 32 provided on the water storage tank 8. Then, the power transmitted to the first coil 32 without contact is supplied from the first coil 32 to the second coil 33 connected to the connecting line 31. Then, the second coil 33 magnetically resonates with the power reception coil 40, thereby transmitting the power from the second coil 33 to the power reception coil 40 of the toilet seat box 5A without contact.

Figure 5:
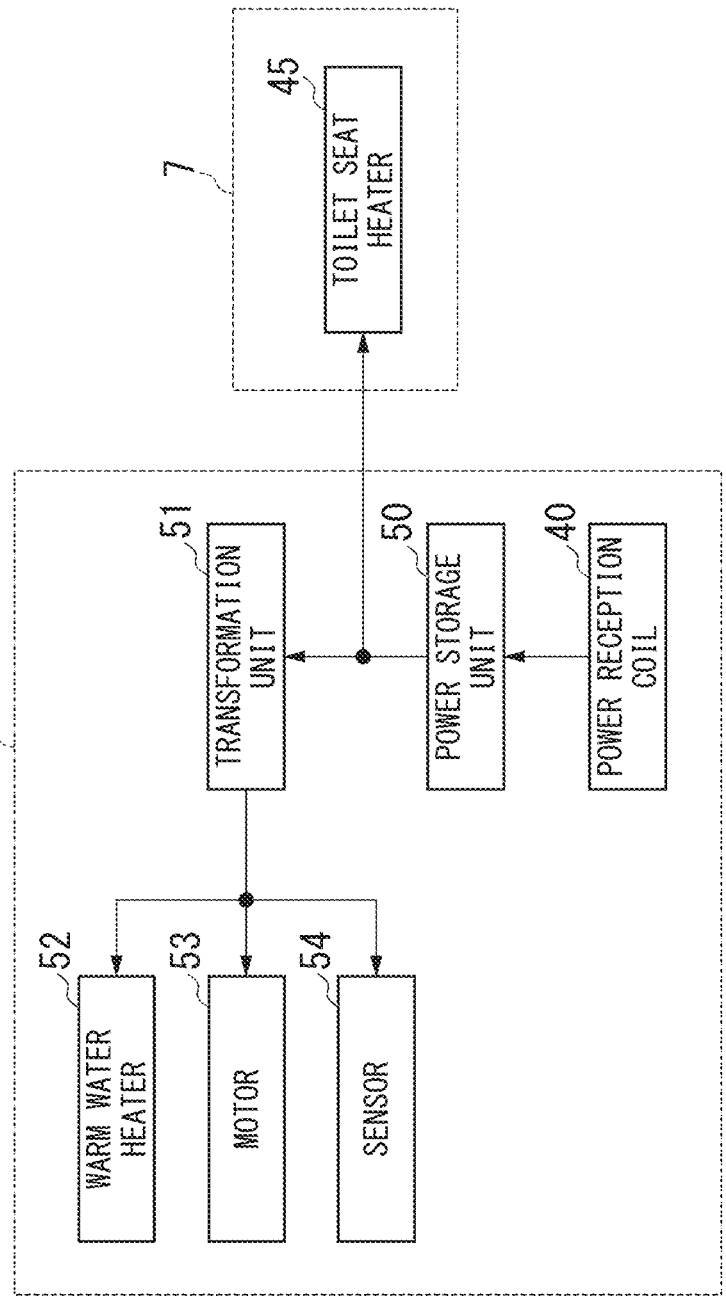
FIG. 5 is a diagram showing an example of a schematic configuration of a toilet seat box 5A according to the second embodiment.

FIG. 5 is a diagram showing an example of a schematic configuration of the toilet seat box 5A according to the second embodiment.

As shown in FIG. 5, the toilet seat box 5A includes the power reception coil 40, the power storage unit 50, the transformation unit 51, the warm water heater 52, the motor 53, and the sensor 54.

The power storage unit 50 stores power which is received in a wired or wireless manner by the power reception coil 40 from the second coil 33 by utilizing magnetic resonance.

The power stored in the power storage unit 50 is supplied to each of the transformation unit 51 and the toilet seat heater 45.

The transformation unit 51 converts the power supplied from the power storage unit 50 to have a predetermined voltage and supplies the converted power to the warm water heater 52, the motor 53, and the sensor 54. Consequently, in a case where a load has changed in the warm water heater 52, the motor 53, and the sensor 54 in this order, power is capable of being supplied to the load without lowering efficiency even when impedance matching is not performed. The toilet seat box 5A of the embodiment may supply power to a load while performing impedance matching without using the power storage unit 50.

Since operation of the toilet system 1A according to the second embodiment is the same as in the first embodiment, description thereof will be omitted.

As described above, the toilet 2A according to the second embodiment includes the relay coil 30 that relays power between the external power supply coil and the power reception coil sane as the first embodiment. The relay coil 30 includes the first coil 32 connected to the one end of the connecting line 31 and the second coil 33 connected to the other end of the connecting line 31. The first coil 32 outputs power received from the power supply coil 21 by utilizing magnetic resonance to the second coil 33 via the connecting line 31. The second coil 33 magnetically resonates with the power reception coil 40 by using the power received via the connecting line 31.

Accordingly, in a case where power is supplied without contact at a place where it is difficult to dispose the power supply coil 21 (power supply device) and the power reception coil 40 (power reception device) close to each other, the relay coil 30 is used, thereby shortening a distance of wireless power transmission compared to the related art. For this reason, it is possible to suppress an increase in a power transmission loss even when a metal is existed nearby.

Herein, for example, the water storage tank 8 has a water storage unit that stores cleaning water. The level or amount of cleaning water stored in the water storage unit fluctuate when the toilet is used. Consequently, in a case where the power supply coil and the power reception coil are mounted such that the water storage unit of the water storage tank 8 is interposed therebetween, there is a possibility that transmission of power from the power supply coil to the power reception coil becomes unstable according to a fluctuation in the level or amount of cleaning water stored in the water storage unit. That is, when there is cleaning water between the power supply coil and the power reception coil, magnetic resonance between the power supply coil and the power reception coil becomes unstable in some cases. Consequently, power cannot be wirelessly transmitted from the power supply coil 21 to the power reception coil 40 in some cases.

In order to solve this problem, in the embodiment, in a case that the non-contact power supply coil 21 is provided on the wall 10 or the floor 11 inside the toilet room (inside the private room), the relay coil 30 is disposed along an outside of the water storage tank 8 or the water storage unit thereof in order to stably supply power to the power reception coil 40 of the toilet. Specifically, the connecting line 31 of the relay coil 30 is disposed along an outside surface of the water storage tank 8 or the water storage unit thereof. Accordingly, the relay coil 30 allows power, which is wirelessly transmitted from the power supply coil 21, to detour around the water storage unit and to be supplied to the power reception coil 40. Accordingly, even in a case where the water storage unit is disposed between the power supply coil 21 and the power reception coil 40, power is capable of being stably and wirelessly transmitted from the power supply coil 21 to the power reception coil 40.

In addition, since the connecting line 31 of the relay coil 30 is disposed along the outside surface of the water storage unit, it is easy to replace the relay coil 30. Since the connecting line 31 of the relay coil 30 is not provided inside the water storage unit, the connecting line does not come into contact with cleaning water. For this reason, it is capable of preventing electric leakage due to the relay coil 30 becoming wet from occurring.

In the embodiment described above, an electromagnetic shield may be provided between the power reception coil 40 and the load. Accordingly, an effect of an electromagnetic field generated in the power reception coil 40 on the load is capable of being reduced.

In addition, in the toilet systems 1 and 1A according to the embodiments described above, in a case where the power supply coil 21 and the power reception coil 40 are mounted so as to be spaced apart from each other because it is difficult to dispose the power supply coil 21 and the power reception coil 40 close to each other due to an obstacle (for example, a wall, a floor, or a part of a facility main body to which power is supplied), the relay coil 30 is mounted onto the obstacle. As the result, the relay coil 30 is capable of delivering power from the power supply coil 21 to the power reception coil 40 along the mounted obstacle. Consequently, in the toilet systems 1 and 1A, a distance over which power is wirelessly transmitted from the power supply coil 21 to the power reception coil 40 is short compared to the related art. For this reason, the relay coil 30 is capable of suppressing an increase in a power transmission loss.

Figure 6:
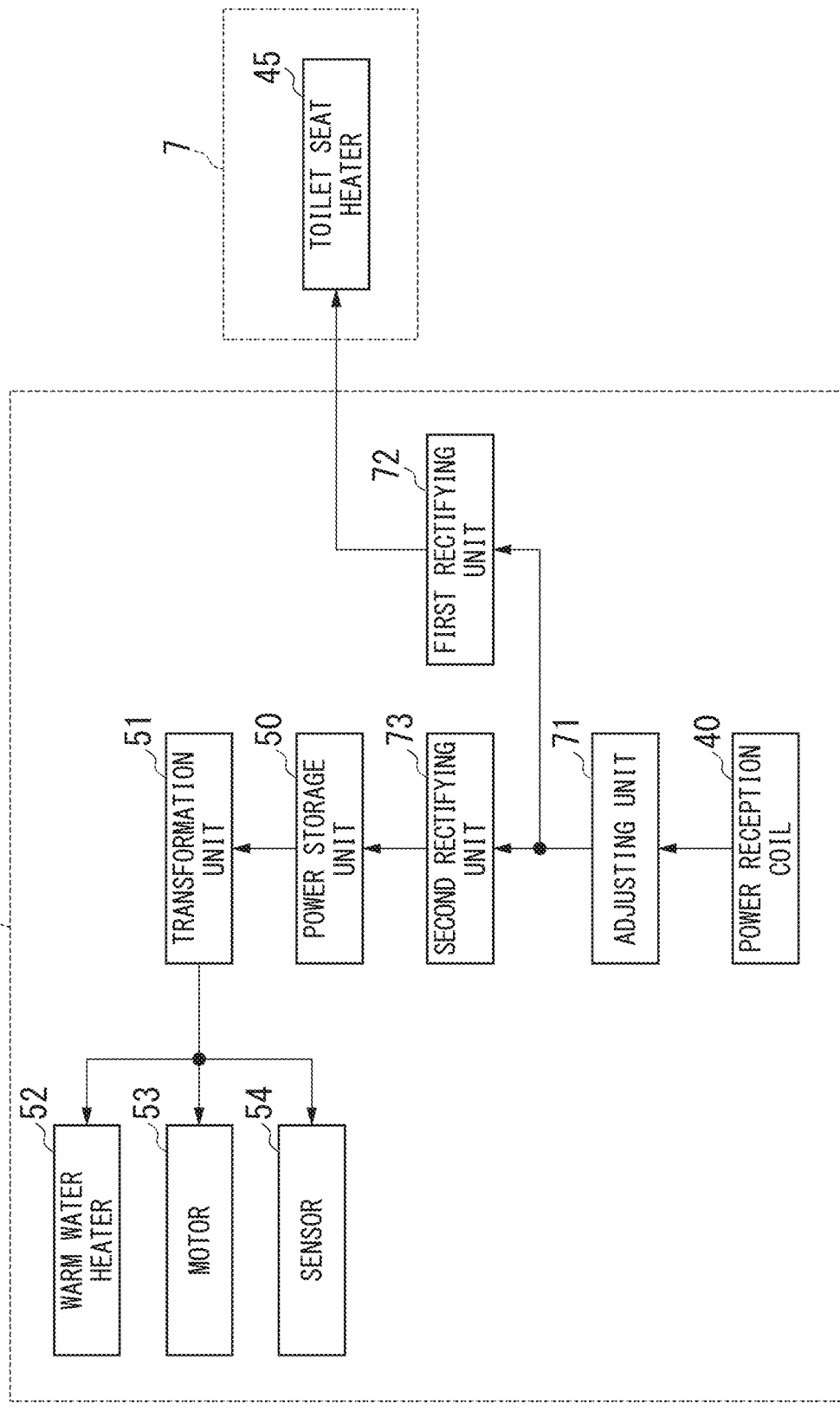
FIG. 6 is a diagram showing an example of a schematic configuration of a toilet seat box 5B according to a first modified example.

Hereinafter, a first modified example of the second embodiment will be described. As shown in FIG. 6, a toilet seat box 5B further having an adjusting unit 71, a first rectifying unit 72, and a second rectifying unit 73 in addition to the configuration members of the toilet seat box 5A is included in the modified example.

FIG. 6 is a diagram showing an example of a schematic configuration of the toilet seat box 5B according to the first modified example.

The toilet seat box 5B includes the power reception coil 40, the adjusting unit 71, the first rectifying unit 72, the second rectifying unit 73, the power storage unit 50, the transformation unit 51, the warm water heater 52, the motor 53, and the sensor 54.

The adjusting unit 71 is connected to the power reception coil 40. The adjusting unit 71 performs impedance matching in accordance with a load which is connected to a later part.

Power supplied from the power reception coil 40 via the adjusting unit 71 is supplied to the first rectifying unit 72 and the second rectifying unit 73. The first rectifying unit 72 rectifies the supplied power and supplies the rectified power to the toilet seat heater 45 in a wired or wireless manner.

The second rectifying unit 73 rectifies the supplied power and supplies the rectified power to the power storage unit 50 in a wired or wireless manner.

The power storage unit 50 stores the power supplied from the second rectifying unit 73. Then, the power stored in the power storage unit 50 is supplied to the transformation unit 51.

The transformation unit 51 converts the power stored in the power storage unit 50 to have a predetermined voltage and supplies the converted power to the warm water heater 52, the motor 53, and the sensor 54.

Figure 7:
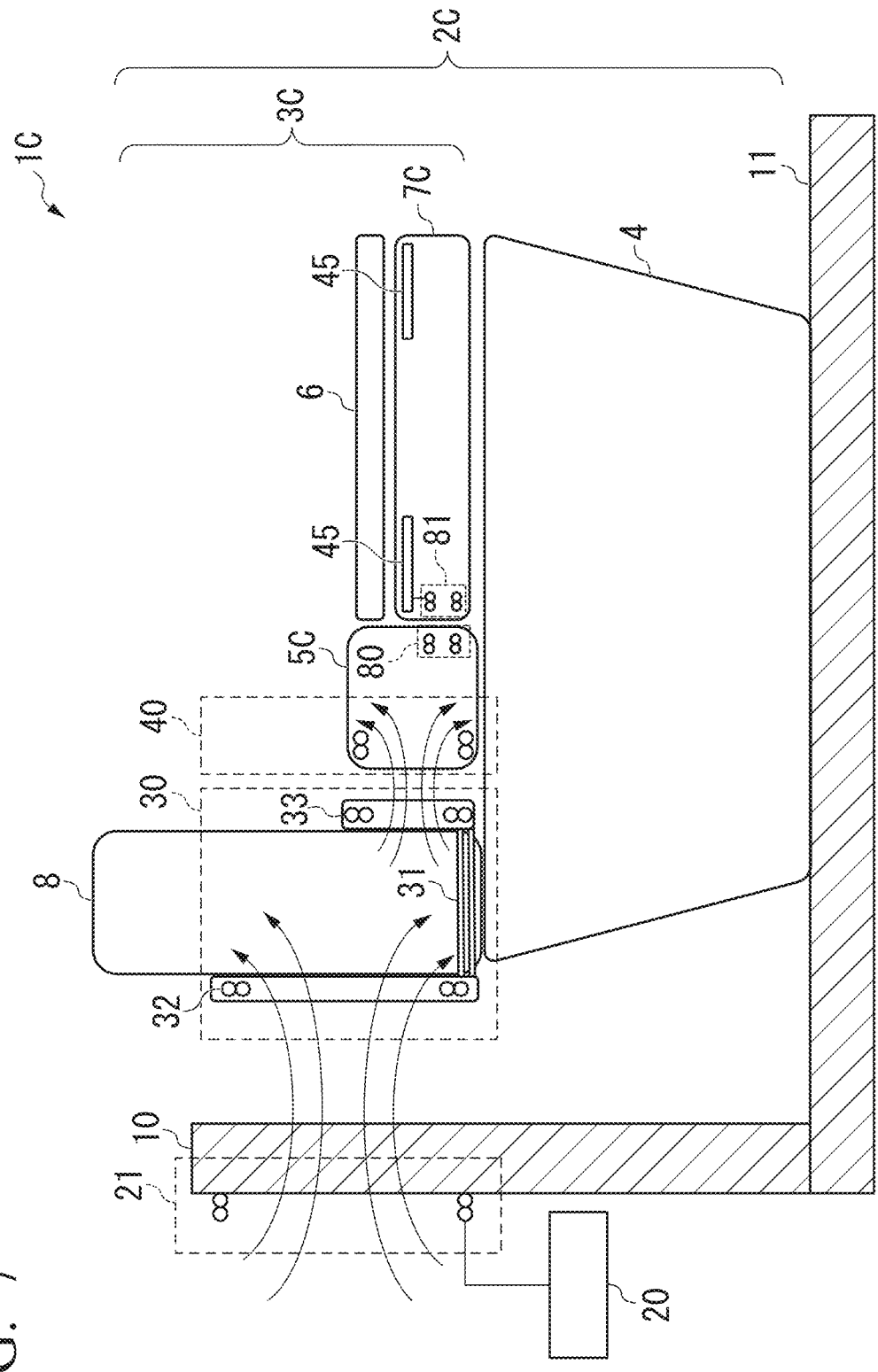
FIG. 7 is a view showing an example of a schematic configuration of a toilet system 1C according to a second modified example.

Hereinafter, a second modified example of the second embodiment will be described. FIG. 7 is a view showing an example of a schematic configuration of a toilet system 1C according to the second modified example. A configuration where power is supplied from the toilet seat box 5C to a toilet seat 7C without contact is included in the modified example.

As shown in FIG. 7, the toilet system 1C according to the second modified example includes a toilet 2C, the power supply unit 20, and the power supply coil 21.

The toilet 2C includes a toilet seat device 3C and the toilet bowl 4.

The toilet seat device 3C is mounted on the toilet bowl 4 provided inside the toilet room. The toilet seat device 3C includes a toilet seat box 5C, the toilet lid 6, the toilet seat 7C, and the water storage tank 8.

A toilet seat heater 45 and a toilet seat coil 81 are provided in the toilet seat 7C. The toilet seat coil 81 is electrically connected to the toilet seat heater 45.

The power reception coil 40 and a main body coil 80 are provided in the toilet seat box 5A.

The main body coil 80 supplies power, which is received from the second coil 33 without contact, to the toilet seat coil 81 without contact by magnetically resonating with the toilet seat coil 81.

Figure 8:
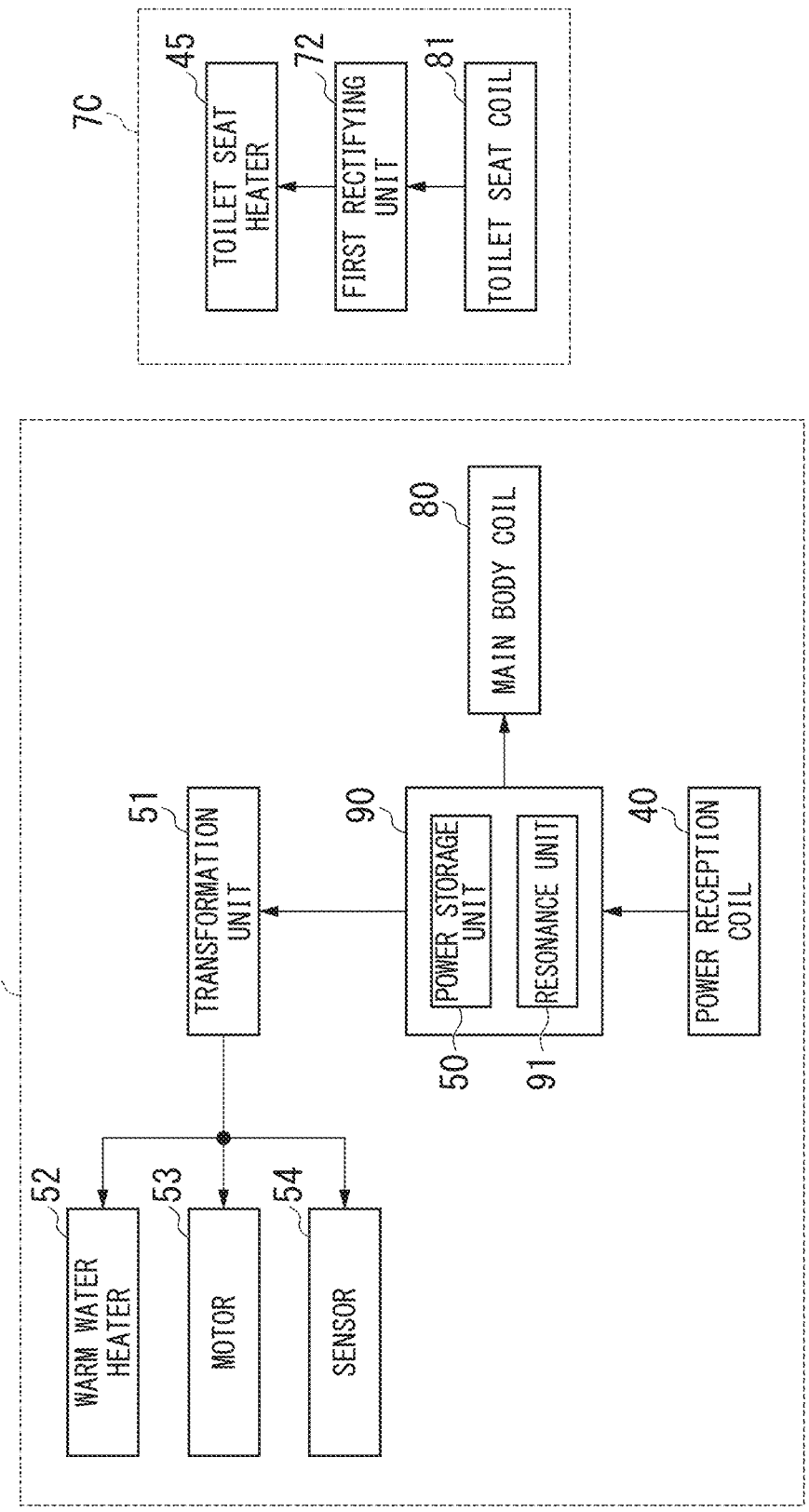
FIG. 8 is a diagram showing an example of a schematic configuration of a toilet seat box 5C according to the second modified example.

FIG. 8 is a diagram showing an example of a schematic configuration of the toilet seat box 5C according to the second modified example.

As shown in FIG. 8, the toilet seat box 5C includes the power reception coil 40, the main body coil 80, a control unit 90, the transformation unit 51, the warm water heater 52, the motor 53, and the sensor 54. The toilet seat 7C includes the toilet seat heater 45, the first rectifying unit 72, and the toilet seat coil 81.

The control unit 90 includes the power storage unit 50 and a resonance unit 91.

The power storage unit 50 stores power supplied from the power reception coil 40. The resonance unit 91 converts the power stored in the power storage unit 50 to power having a predetermined frequency and outputs the converted power to the main body coil 80. Accordingly, the main body coil 80 magnetically resonating with the toilet seat coil 81, thereby transmitting the power having the predetermined frequency from the main body coil 80 to the toilet seat coil 81 without contact. The toilet seat coil 81 supplies the transmitted power to the first rectifying unit 72. The first rectifying unit 72 rectifies the supplied power and supplies the rectified power to the toilet seat heater 45.

The transformation unit 51 converts the power stored in the power storage unit 50 to have a predetermined voltage and supplies the converted power to the warm water heater 52, the motor 53, and the sensor 54.

In the embodiments described above, at least any one of the connecting line 31, the first coil 32, and the second coil 33 of the relay coil 30 may be a thin conductive layer printed on an insulating member. For example, the insulating member is a film. That is, the relay coil 30 may be a film coil. The relay coil 30 may be a thin conductive layer printed on a plurality of film layers.

In the embodiments described above, the capacitance of each of the power supply coil 21, the power reception coil 40, and the relay coil 30 may be stray capacitance, or the capacitance of a physical capacitor.

In the embodiments described above, a position where the relay coil 30 is provided may be on a front surface of the toilet 2, or may be inside the toilet 2.

Although a case where the relay coil 30 is applied to the toilet 2 has been described in the embodiments described above, the invention is not limited thereto. For example, the relay coil 30 may be applied to a facility that requires power, such as furniture, joineries, home appliances, and air conditioning facilities. For example, the relay coil 30 is applicable to a device that requires supply of power via an obstacle or a part of a facility main body thereof from the power supply coil 21 to the power reception coil 40 of the facility.

In addition, each unit of the toilet seat device according to the embodiments described above may be realized by hardware, may be realized by software, or may be realized by a combination of hardware and software.

In addition, the toilet seat device according to the embodiments described above may be realized by a computer. In this case, the toilet seat device may be realized by a program for realizing the function being recorded onto a computer readable recording medium and a computer system being caused to read and execute the program recorded on the recording medium. Herein, the "computer system" includes hardware such as an OS and peripherals. In addition, the "computer readable recording medium" refers to a portable medium such as a flexible disk, a magneto-optical disk, a ROM, and a CD-ROM and a storage device such as a hard disk mounted inside the computer system. The "computer readable recording medium" may include a medium that dynamically holds a program for a short period of time as in a communication line in a case of transmitting the program via a network such as the Internet or a communication circuit such as a telephone circuit and a medium that holds a program for a certain period of time such as a volatile memory inside a computer system, which serves as a server or a client of this case. The program may be a program for realizing a part of the function described above, may be a program that can realize the function described above in combination with a program already recorded on a computer system, or may be a program realized by using a programmable logic device such as a field programmable gate array (FPGA).

Although the embodiments of the invention have been described in detail hereinbefore with reference to the drawings, a specific configuration is not limited to the embodiments, and design that does not depart from the spirit of the invention is also included as well.

In the toilet, an increase in a power transmission loss is capable of being suppressed by using the relay coil in a case where power is supplied without contact at a place where it is difficult to dispose the power supply device and the power reception device close to each other.

REFERENCE SIGNS LIST

1: toilet system
2: toilet
3: toilet seat device
4: toilet bowl
5: toilet seat box
20: power supply unit
21: power supply coil
30: relay coil
31: connecting line
32: first coil
33: second coil
50: power storage unit
51: transformation unit

The invention claimed is:
1. A toilet configured to be provided at a toilet room having a wall and a floor, the toilet comprising:
a water storage storing cleaning water;
a relay coil that has a connecting line, a first coil connected to a first end of the connecting line, and a second coil connected to a second end of the connecting line;

a power supply coil provided under the floor or behind the wall; and a power reception coil, wherein the first coil is configured to output power, which is received from a power supply coil by utilizing magnetic resonance, to the second coil via the connecting line, the second coil is configured to supply the power, which is received via the connecting line, to the power reception coil by utilizing magnetic resonance, and the first coil installed on a back exterior surface of the water storage, the second coil installed on a front exterior surface of the water storage, and the connecting line is installed on a side exterior surface of the water storage tank to detour the water storage.

2. The toilet of claim 1, wherein at least any one of the first coil, the second coil, and the connecting line is a conductive layer printed on an insulating member.

3. The toilet of claim 1, wherein the relay coil is provided on a toilet or a water storage tank of the toilet device.

4. The toilet of claim 3, wherein the connecting line is disposed on the toilet or the water storage tank of the toilet device.

5. The toilet of claim 1, further comprising:

a power storage unit that stores the power in which the power reception coil receives from the second coil by utilizing magnetic resonance and is configured to supply the stored power to a load.

6. The toilet of claim 1, further comprising a toilet seat, wherein the water storage is provided inside the toilet, wherein when the power supply coil is provided under the floor, the first coil is coiled around a drain pipe, the second coil is installed at a top part of the toilet such that the second coil is positioned above the first coil, the connecting line connecting the first coil and the second coil is installed inside the toilet and outside the water storage, and the power reception coil is installed inside the toilet seat.

7. The toilet of claim 1, wherein the water storage is a storage tank provided to be faced to the wall, wherein when the power supply coil is provided behind the wall, the first coil is provided along a back wall of the storage tank, the second coil is provided at a front side of the storage tank so as to be along a front wall of the storage tank, the power reception coil is installed inside a box provided in front of the storage tank such that the power reception coil is positioned forward from the second coil, wherein a diameter of the power reception coil is equal to a diameter of the second coil, wherein the connecting line connecting the first coil and the second coil is provided outside the storage tank.

* * * * *